United States Patent [19]

Jernigan

[11] Patent Number: 4,528,817
[45] Date of Patent: Jul. 16, 1985

[54] PURIFYING GEOTHERMAL STEAM

[75] Inventor: Robert T. Jernigan, Lake Jackson, Tex.

[73] Assignee: The Dow Chemical Company, Midland, Mich.

[21] Appl. No.: 531,799

[22] Filed: Sep. 13, 1983

Related U.S. Application Data

[63] Continuation-in-part of Ser. No. 325,472, Nov. 27, 1981, Pat. No. 4,414,817.

[51] Int. Cl.³ .............................................. F03G 7/00
[52] U.S. Cl. ..................................... 60/641.2; 60/689; 423/573 R
[58] Field of Search .................... 60/641.2, 689, 641.3, 60/641.4, 641.5; 423/573 R

[56] References Cited

U.S. PATENT DOCUMENTS

| 4,088,743 | 5/1978 | Hass et al. | 60/641.2 |
| 4,123,506 | 10/1978 | Spevack | 60/641.2 |
| 4,363,215 | 12/1982 | Sharp | 60/641.2 |
| 4,414,817 | 11/1983 | Jernigan | 60/641.2 |

Primary Examiner—Allen M. Ostrager
Attorney, Agent, or Firm—B. G. Colley

[57] ABSTRACT

Residual geothermal steam containing hydrogen sulfide from a steam turbine is condensed with an aqueous solution of ferric chelate whereby the hydrogen sulfide is converted to free sulfur and the ferric chelate is converted to ferrous chelate. The ferrous chelate is subsequently oxidized back to the ferric state and reused.

10 Claims, 1 Drawing Figure

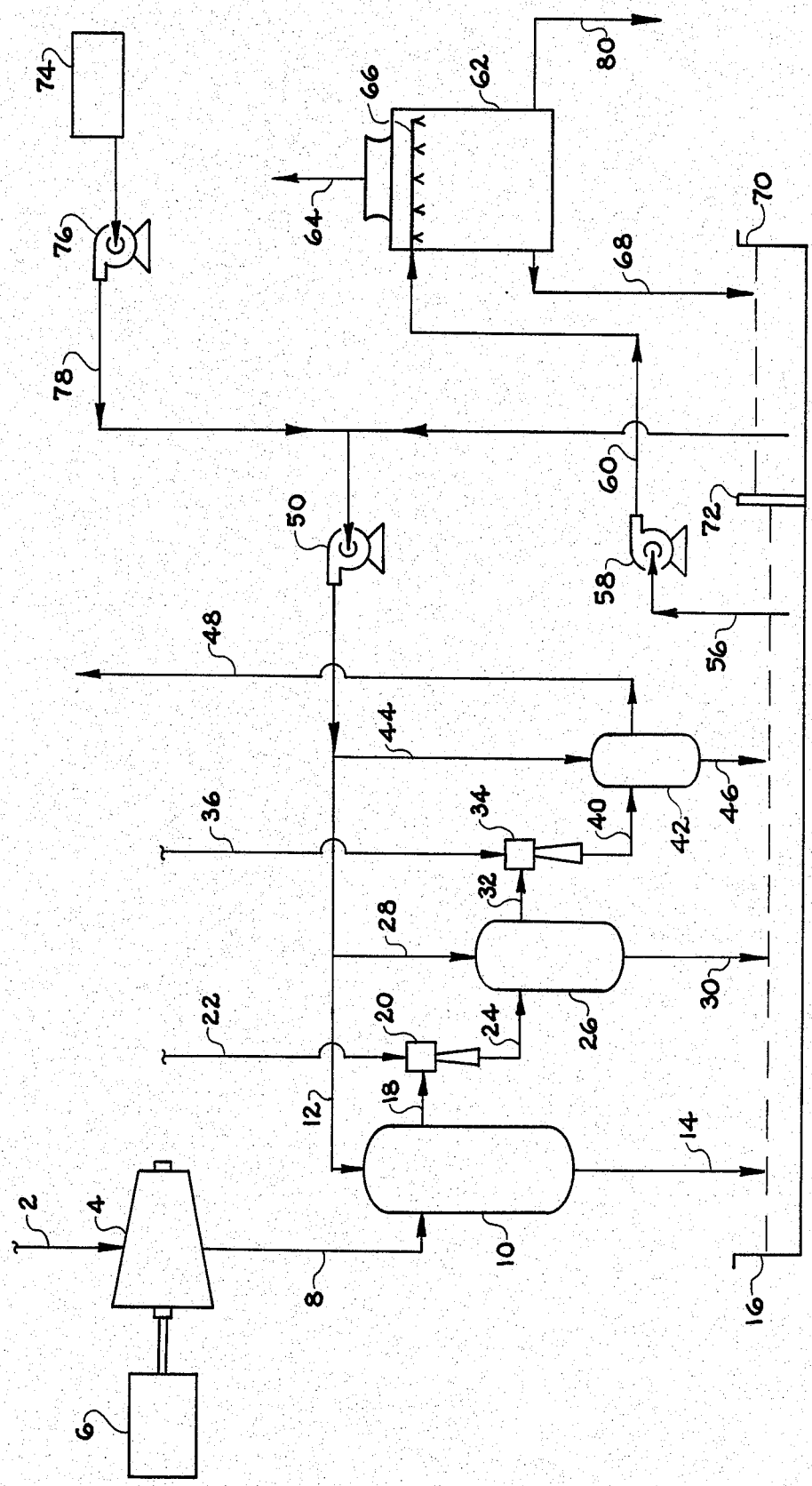

PURIFYING GEOTHERMAL STEAM

CROSS-REFERENCE TO RELATED APPLICATIONS

This application is a continuation-in-part of Ser. No. 325,472, filed Nov. 27, 1981, now U.S. Pat. No. 4,414,817.

BACKGROUND OF THE INVENTION

This invention relates to a process wherein exhaust steam from a steam turbine operated by geothermal steam is condensed with an aqueous solution containing ferric chelate and the hydrogen sulfide in said geothermal steam is removed.

It is known from U.S. Pat. No. 4,123,506 dated Oct. 31, 1978 and U.S. Pat. No. 4,202,864, dated May 13, 1980 that geothermal steam containing $H_2S$ can be purified by contacting the steam with a metal compound that forms insoluble metallic sulfides.

It is also known from U.S. Pat. No. 4,196,183, dated Apr. 1, 1980 that geothermal steam containing $H_2S$ can be purified by added oxygen and passing it through an activated carbon bed.

It is further known from U.S. Pat. No. 4,363,215, dated Dec. 14, 1982 that geothermal steam containing $H_2S$ can be purified by the reaction of the steam with hydrogen peroxide and a ferrous catalyst.

Various processes for hydrogen sulfide control in geothermal steam are outlined in the U.S. Department of Energy Report #DOE/EV-0068 (March 1980) by F. B. Stephens, et al.

The removal of $H_2S$ from sour gases and sour water with ferric chelates is shown by U.S. Pat. Nos. 4,009,251, 4,091,073 and 4,076,621 respectively.

SUMMARY OF THE INVENTION

The present invention is directed to a process wherein residual steam containing $H_2S$ from a geothermal steam power plant is purified before release into the atmosphere.

The process of this invention has the following steps:
(A) condensing said residual steam with an aqueous solution containing a ferric chelate in a condensing zone under a temperature sufficiently low to convert said steam and said solution into an aqueous solution containing dissolved hydrogen sulfide and its ions and said ferric chelate;
(B) converting said aqueous sulfide solution to an aqueous solution containing free sulfur and ferrous chelate by contacting said aqueous sulfide solution with an aqueous solution of ferric chelate containing a sufficient amount of ferric chelate to completely oxidize said sulfide ions to sulfur;
(C) converting said ferrous chelate solution with air in a cooling zone into an aqueous solution containing ferric chelate; and
(D) recycling said ferric chelate solution back to said condensing zone.

In the process of this invention about 80 percent of the $H_2S$ gas in the geothermal steam is absorbed into the aqueous phase of a direct contact steam condensor whereby the $H_2S$ is treated with ferric chelate to produce finely divided sulfur. The noncondensed or nonabsorbed $H_2S$ can be exhausted to the atmosphere or if zero discharge is desired or required, the $H_2S$ gas can be absorbed with conventional $H_2S$ absorbers such as aqueous alkanol amine solutions or potassium carbonate solutions or caustic solutions.

BRIEF DESCRIPTION OF THE DRAWING

FIG. 1 illustrates a process in which this invention is applied for the oxidation of hydrogen sulfide contained in a liquid stream produced by the condensation of geothermal steam and as such eliminates the environmental pollution problems associated with the discharge of an effluent stream containing the toxic and noxious hydrogen sulfide. A similar application could be made to streams resulting from industrial processes.

In the drawing, the geothermal steam from line 2 is used to power a steam turbine 4 which is connected to an electric power generator 6. The turbine 4 exhausts through line 8 to a direct contact condenser 10. Cooling water containing chelated iron (ferric chelate) from line 12 is sprayed into condenser 10 for this condensation and passes from the condenser 10 through line 14 to the hot well 16 operating at 38°–52° C. (100°–126° F.). Noncondensable gases such as $CO_2$, $N_2$, $O_2$, and $H_2S$ are removed from the main condenser 10 through line 18 by two steam jet ejectors 20 and 34 and the associated condensers 26 and 42. The ejectors 20 and 34 are operated by steam supplied by lines 22 and 36 respectively. These ejectors create a partial vacuum or low pressure zone. The exhaust steam from the ejector 20 is carried by line 24 to the condenser 26 and by line 32 to the second ejector 34. The exhaust steam from ejector 34 is carried by line 40 to condenser 42. Cooling water from line 12 is supplied to each of the condensers 26 and 42 by lines 28 and 44 respectively. The condensed steam from condenser 26 and 42 flows by means of lines 30 and 46 to the hot well 16. The non-condensable gases and the exhaust steam are then vented to a conventional caustic scrubber, alkanol amine or potassium carbonate unit through line 48 for removal of the $H_2S$ gases.

Pump 58 is used to pump the combined condensed geothermal steam and cooling water from the hot well 16 through line 60 to the induced-draft cooling tower 62 with internal spray heads 66 where an amount of water equal to approximately 80% of the condensed steam is evaporated by the air flow through the tower which also strips all of the dissolved hydrogen sulfide from the liquid and it would be vented to the environment by means of the air stream 64 except for the use of chelated iron as described herein. The excess condensed steam which is not evaporated overflows a weir (not shown) in the base of the cooling tower 62 for disposal by line 80. The remainder of the cold water flows through line 68 to the relatively cold well 70 which operates at 24°–29° C. (75°–85° F.). Pump 50 is used to pump the cold water from the cold well 70 to the condensers 42, 26, and 10. The hot well 16 is separated from the cold well 70 by a weir 72.

In order to prevent the release of the dissolved hydrogen sulfide to the environment in the air stream 64 flowing from the top of the cooling tower 62, an amount of chelated iron is added to the circulating water which is greater than the stoichiometric amount required to oxidize the dissolved hydrogen sulfide in the hot well 16. In this manner, the dissolved hydrogen sulfide is effectively oxidized before the water enters the top of the cooling tower 62 from line 60. The air flow and time of contact between the air and water in the cooling tower 62 is sufficiently long that the ferrous chelate which results from the oxidation of dissolved hydrogen sulfide in the hot well 16 and associated piping 56 and 60 is reoxidized to the active ferric state as it passes down through the cooling tower 62. Elemental sulfur in a finely divided solid form produced by this process circulates freely throughout the system and may be recovered by conventional means from the overflow line 80. Such recovery methods may allow the sulfur to agglomerate into a heavy slurry after which the supernatent liquid may be removed by decantation, centrifugation, filtration, and the like. In order to maintain at least the stoichiometric amount of iron chelate required for this process, an amount of fresh iron chelate equal to the amount lost in the overflow line 80 is added from the storage vessel 74 by pump 76 and inlet line 78.

DETAILED DESCRIPTION OF THE INVENTION

Geothermal steam from The Geysers Known Geothermal Resource Area (KGRA) has been found to contain the following ranges and average values of hydrogen sulfide and other impurities in parts per million.

| GAS | RANGE | AVERAGE |
|---|---|---|
| $H_2S$ | 5–1600 | 222 |
| $CO_2$ | 290–30600 | 3260 |
| $CH_4$ | 13–1447 | 194 |
| $NH_3$ | 9–1060 | 194 |
| $N_2$ | 6–638 | 52 |
| $H_2$ | 11–218 | 56 |

The purpose of this invention is to reduce, abate, or eliminate the hydrogen sulfide ($H_2S$) from the condensed steam after the steam is used to power a turbine. This invention can also be applied to other KGRA's that depend on liquid-dominated resources as the source of energy. In these cases, the geothermal fluids would be treated directly thus eliminating the condensation step.

In the process of this invention, it has been found that the amount of ferric chelate used for the sulfide conversion should be in the range from about 1.0 to about 6.0 moles and preferably about 1.2 to about 3.0 moles of ferric chelate per mole of $H_2S$.

The temperature range of the sulfide conversion step should be in the range from about 1.0° to about 99° C. and preferably in the range from about 25° to about 60° C.

The sulfide conversion step should also be conducted at a pH in the range from about 5 to about 10 and preferably in the range from about 6.8 to about 8.3.

The temperature range of the condensing zone should be in the range from about 1.0° to about 99° C. and preferably in the range from about 25° to about 65° C.

The temperature range of the chelate converting zone should be in the range from about 1.0° to about 99° C. and preferably in the range from about 25° to about 65° C.

Detailed examples of the invention are given below for purposes of further illustrating the invention.

EXAMPLES 1–4

A fully chelated iron solution, Versenol ® iron, which contained 4% iron was prepared from the trisodium salt of N-hydroxyethylethylenediaminetriacetic acid ($Na_3$ HEDTA) and ferric nitrate. After baseline data were obtained on the hydrogen sulfide emissions using the apparatus of the drawing when no iron chelate was present (i.e. the control), a drum of the Versenol ® iron concentrate was added rapidly to the cold well 70. Thereafter, pump 76 was used to meter in additional iron chelate at a rate of about two pounds per hour of iron to balance that which was lost in the overflow 80. This resulted in the maintenance of an iron concentration in the circulating water of about 20 parts per million (ppm) which is slightly greater than the stoichiometric requirement of 14 ppm in the hot well 16. Immediately after the addition of the iron chelate to the system, the hydrogen sulfide emissions from the cooling tower became immeasurably small and could not be detected in this stream throughout the remainder of the trial.

Data obtained during this trial are presented in Table I. These data show that while the instant invention is extremely effective for the removal of hydrogen sulfide from aqueous streams, the relatively constant percentage of hydrogen sulfide in the noncondensable gas stream 48 showed it to have little effect on gaseous streams containing hydrogen sulfide.

TABLE I

| RUN | STEAM FLOW LINE 2 (M #/hr) | $H_2S$ IN LINE 2 (#/hr) | $H_2S$ IN AIR STREAM 64 (ppm) | $H_2S$ IN LINE 48 (#/hr) | $H_2S$ IN LINE 48 (% OF LINE 2) | OVERFLOW LINE 80 (M #/hr) | Fe FEED RATE (#/hr) | Fe CONCENTRATION IN COLD WELL 70 (ppm) |
|---|---|---|---|---|---|---|---|---|
| Control | 180 | 35.0 | 3.8 | 6.5 | 19 | 38 | 0 | 0 |
| Example 1 | 183 | 34.5 | 0 | 5.1 | 15 | 54 | 2.0 | 21 |
| Example 2 | 179 | 33.1 | 0 | 5.6 | 17 | 44 | 2.3 | 21 |
| Example 3 | 178 | 33.7 | 0 | 6.3 | 19 | 48 | 2.1 | 20 |
| Example 4 | 178 | 34.2 | 0 | 6.0 | 18 | 54 | 1.8 | 20 |

Chelating agents useful in preparing the ferric chelate of the present invention include those chelating or complexing agents which form water-soluble chelate. Representative of such chelating agents are the aminocarboxylic acids, such as nitrilotriacetic acid, N-hydroxyethylaminodiacetic acid, ethylenediaminetetraacetic acid, N-hydroxyethylethylenediaminetriacetic acid, diethylenetriaminepentaacetic acid, cyclohexanediaminetetraacetic acid, triethylenetetraaminehexaacetic acid and the like, including the salts thereof. Of such chelating agents, ethylenediaminetetraacetic and N-hydroxyethylethylenediaminetriacetic acids, are most advantageously employed in preparing the ferric chelate used herein.

I claim:
1. A process for using geothermal steam containing $H_2S$ to generate electricity with subsequent purification of the residual steam comprising
 (A) condensing said residual steam with an aqueous solution containing a ferric chelate in a condensing zone under a temperature sufficiently low to convert said steam and said solution into an aqueous solution containing dissolved hydrogen sulfide and its ions and said ferric chelate;

(B) converting said aqueous sulfide solution to an aqueous solution containing free sulfur and ferrous chelate by contacting said aqueous sulfide solution with an aqueous solution of ferric chelate containing a sufficient amount of ferric chelate to completely oxidize said sulfide ions to sulfur;

(C) converting said ferrous chelate solution with air in a cooling zone into an aqueous solution containing ferric chelate; and (D) recycling said ferric chelate solution back to said condensing zone.

2. The process as set forth in claim 1 wherein the amount of ferric chelate used is in the range from about 1.0 to about 6.0 moles of ferric chelate per mole of $H_2S$.

3. The process as set forth in claim 1 wherein the ferric chelate range is from about 1.2 to about 3.0 moles of ferric chelate per mole of $H_2S$.

4. The process as set forth in claim 1 which comprises the additional step of continuously adding ferric chelate as needed to maintain said sufficient amount.

5. A process for using geothermal steam containing $H_2S$ to generate electricity with subsequent purification of the residual steam comprising (A) condensing said residual steam with an aqueous solution containing a ferric chelate in a condensing zone under a temperature in the range from 1.0° to 99° C. whereby a mixture of noncondensable gases containing $H_2S$ and an aqueous solution containing dissolved hydrogen sulfide and its ions with said ferric chelate is obtained;

(B) converting said aqueous sulfide solution to an aqueous solution containing free sulfur and ferrous chelate by contacting said aqueous sulfide solution with an aqueous solution of ferric chelate containing a sufficient amount of ferric chelate to oxidize said sulfide ions to sulfur under conditions which are sufficient to completely convert said sulfide ions;

(C) converting said solution containing ferrous chelate solution with air in a cooling zone at a temperature in the range from 1.0° to 99° C. into an aqueous solution containing ferric chelate; and (D) recycling said ferric chelate solution back to said condensing zone.

6. The process as set forth in claim 5 which comprises the additional step of removing $H_2S$ from said noncondensable gases before said gases are vented to the atmosphere.

7. The process as set forth in claim 5 wherein the amount of ferric chelate used is in the range from about 1.0 to about 6.0 moles of ferric chelate per mole of $H_2S$.

8. The process as set forth in claim 5 wherein the amount of ferric chelate used is in the range from about 1.2 to 3.0 moles of ferric chelate per mole of $H_2S$.

9. The process as set forth in claim 5 wherein said sulfide conversion is carried out at a temperature in the range from about 1.0 to about 99° C., and a pH in the range from about 5 to 10.

10. The process as set forth in claim 5 wherein said sulfide conversion is carried out at a temperature in the range from about 25° to about 60° C. and a pH in the range from about 6.8 to 8.3.

* * * * *